United States Patent
Hariu et al.

(10) Patent No.: US 10,457,143 B2
(45) Date of Patent: Oct. 29, 2019

(54) FASTENING STRUCTURE AND ACCELERATOR PEDAL DEVICE USING SAME

(71) Applicant: DENSO CORPORATION, Kariya, Aichi-pref. (JP)

(72) Inventors: Tetsuo Hariu, Kariya (JP); Haruhiko Suzuki, Kariya (JP); Takehiro Saito, Kariya (JP); Hiroshi Saji, Obu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/571,114

(22) PCT Filed: Apr. 19, 2016

(86) PCT No.: PCT/JP2016/002090
§ 371 (c)(1),
(2) Date: Nov. 1, 2017

(87) PCT Pub. No.: WO2016/181614
PCT Pub. Date: Nov. 17, 2016

(65) Prior Publication Data
US 2018/0134155 A1   May 17, 2018

(30) Foreign Application Priority Data

May 12, 2015  (JP) .................................. 2015-097156
Mar. 31, 2016  (JP) .................................. 2016-070395

(51) Int. Cl.
*F16B 5/02*   (2006.01)
*B60K 26/02*  (2006.01)
*F16B 31/02*  (2006.01)
*F16B 23/00*  (2006.01)

(52) U.S. Cl.
CPC ................ *B60K 26/02* (2013.01); *F16B 5/02* (2013.01); *F16B 31/02* (2013.01); *F16B 23/0007* (2013.01)

(58) Field of Classification Search
CPC .......... F16B 5/0241; F16B 5/025; F16B 5/02; F16B 23/0007; F16B 17/008; F16B 31/024; G05G 1/327; G05G 1/323; G05G 1/32; G05G 1/30; G05G 1/44; G05G 1/445;
(Continued)

(56) References Cited

U.S. PATENT DOCUMENTS 3,731,961 A * 5/1973 Becker .................... B60R 19/24
                                                                403/408.1
4,211,128 A * 7/1980 Plumer ................. B25B 13/485
                                                                411/403
(Continued)

FOREIGN PATENT DOCUMENTS

| JP | 62-41412 | 2/1987 |
|---|---|---|
| JP | 2013-104494 | 5/2013 |
| JP | 2014-47882 | 3/2014 |

*Primary Examiner* — Richard W Ridley
*Assistant Examiner* — Brian J McGovern
(74) *Attorney, Agent, or Firm* — Nixon & Vanderhye P.C.

(57) ABSTRACT

In a fastening structure and an accelerator pedal device using the fastening structure, a screw is inserted into a screw insertion hole of a cover from a side of the cover facing away from a housing, and the screw is screwed into a screwing hole of a fastening portion of the housing. An annular space is provided between an edge of the screw insertion hole and the fastening portion.

4 Claims, 10 Drawing Sheets

(58) Field of Classification Search
CPC .. G05G 5/03; G05G 5/05; B60T 7/065; B60T 7/06; B60T 7/04
See application file for complete search history.

(56) References Cited

U.S. PATENT DOCUMENTS

| | | | | |
|---|---|---|---|---|
| 5,713,118 | A | * | 2/1998 | Swann .................... B23Q 3/103 269/900 |
| 2008/0181745 | A1 | * | 7/2008 | Naik ..................... F16B 5/0241 411/107 |
| 2008/0263861 | A1 | * | 10/2008 | Issler .................... F02F 3/0023 29/888.044 |
| 2008/0317545 | A1 | | 12/2008 | Hirose et al. |
| 2010/0056284 | A1 | * | 3/2010 | Eguchi ...................... F16B 5/02 470/26 |
| 2013/0220771 | A1 | * | 8/2013 | Schroader ............ B65G 47/844 198/370.02 |
| 2017/0298775 | A1 | * | 10/2017 | Mathias ................ F01D 25/243 |

* cited by examiner

FASTENING STRUCTURE AND ACCELERATOR PEDAL DEVICE USING SAME

CROSS REFERENCE TO RELATED APPLICATION

This application is the U.S. national phase of International Application No. PCT/JP2016/002090 filed on Apr. 19, 2016 which designated the U.S. and claims priority to Japanese Patent Applications No. 2015-097156 filed on May 12, 2015, and No. 2016-070395 filed on Mar. 31, 2016, the entire contents of each of which are hereby incorporated by reference.

TECHNICAL FIELD

The present disclosure relates to a fastening structure and an accelerator pedal device using the fastening structure.

BACKGROUND ART

A screw is widely used as a fastening member for fastening two fastened members to each other. For example, when a first fastened member and a second fastened member are fastened to each other, the screw is inserted into a screw insertion hole of the second fastened member from a side of the second fastened member facing away from the first fastened member, and screwed into the first fastened member. In an accelerator device disclosed in Patent Literature 1, a "tamper-proof screw" which is a type of the screw is used to fasten a housing and a cover to each other.

In Patent Literature 1, the screw is screwed in a state where the housing and the cover are combined together so that an edge of a screw insertion hole of the cover abuts against an edge of a screwing hole of the housing. For that reason, the edge of the screwing hole of the housing is compressed between the cover and a screw thread. As a result, a large tensile stress is generated in a root of a thread groove in the vicinity of the edge of the screwing hole whereby breakage such that the edge of the screwing hole is chipped may occur.

PRIOR ART LITERATURE

Patent Literature

Patent Literature 1: JP 2014-47882 A

SUMMARY

The present disclosure has been made in view of the above points, and an object of the present disclosure is to provide a fastening structure in which breakage of a fastened member is prevented, and an accelerator pedal device using the fastening structure.

According to an aspect of the present disclosure, a fastening structure includes a first fastened member, a second fastened member that is combined with the first fastened member, and a screw fastening the first fastened member and the second fastened member. The screw is inserted into a screw insertion hole of the second fastened member from a side of the second fastened member facing away from the first fastened member, and the screw is screwed into the first fastened member. An annular space is provided between an edge of the screw insertion hole of the second fastened member and the first fastened member.

As described above, by providing the annular space, an edge of a screwing hole of the first fastened member can be bent to escape into the annular space even if the edge is pushed up toward the second fastened member by a screw thread of the screw when the screw is screwed. For that reason, a large tensile stress can be prevented from occurring in a root of a thread groove in the vicinity of the edge of the screwing hole. Therefore, the fastening structure in which breakage such as chipping of the edge of the screwing hole is prevented can be obtained.

According to another aspect of the present disclosure, an accelerator pedal device includes a first fastened member, a second fastened member that is combined with the first fastened member, a screw fastening the first fastened member and the second fastened member, a shaft that has one end rotatably supported by the first fastened member and the other end rotatably supported by the second fastened member, an accelerator pedal that includes a pedal boss portion connected to the shaft, a link that includes a link boss portion provided to face the pedal boss portion in an axial direction, and a pressing device. The screw is inserted into a screw insertion hole of the second fastened member from a side of the second fastened member facing away from the first fastened member, and the screw is screwed into the first fastened member. The pressing device presses the pedal boss portion in a direction away from the link boss portion and toward one of the first fastened member and the second fastened member while pressing the link boss portion in a direction away from the pedal boss portion and toward another of the first fastened member and the second fastened member, with a force which increases with increase of a rotational angle of the accelerator pedal from a fully closed position. An annular space is provided between an edge of the screw insertion hole of the second fastened member and the first fastened member.

In the accelerator pedal device described above, when the accelerator pedal is depressed, the first fastened member and the second fastened member are pressed by the pressing device in a direction away from each other, and a stress (hereinafter referred to as a stress at the time of depression) is exerted on the periphery of a screwing hole of the first fastened member. On the other hand, in the present disclosure, as described above, by providing the annular space, a large tensile stress is prevented from occurring in a root of a thread groove in the vicinity of an edge of the screwing hole due to the screwing of the screw. For that reason, even when the stress is exerted at the time of depression, breakage such as chipping of the edge of the screwing hole can be prevented.

DESCRIPTION OF EMBODIMENTS

Hereinafter, multiple embodiments for implementing the present disclosure will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 1:
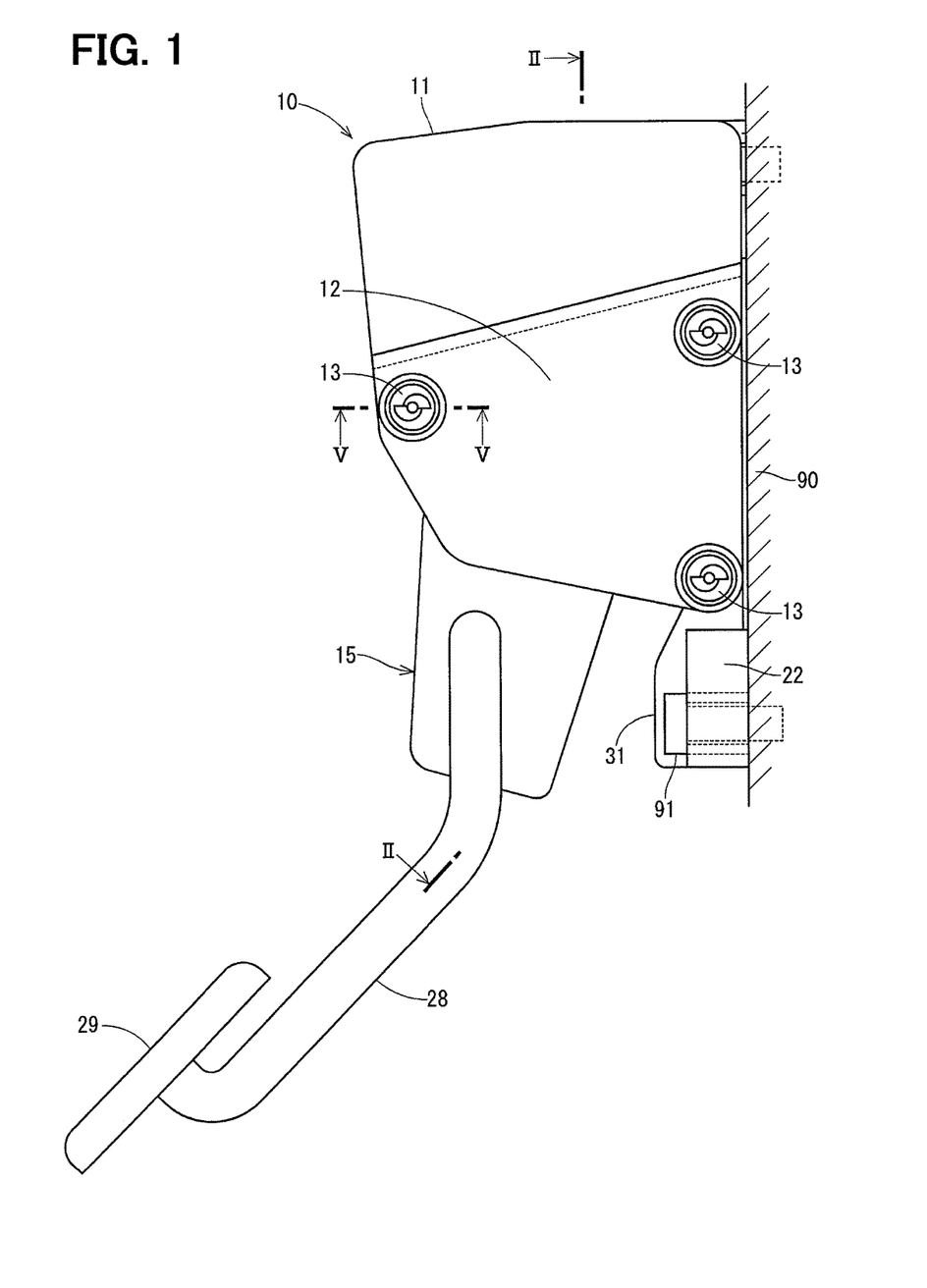
FIG. 1 is a diagram illustrating an accelerator pedal device according to a first embodiment of the present disclosure.
Figure 2:
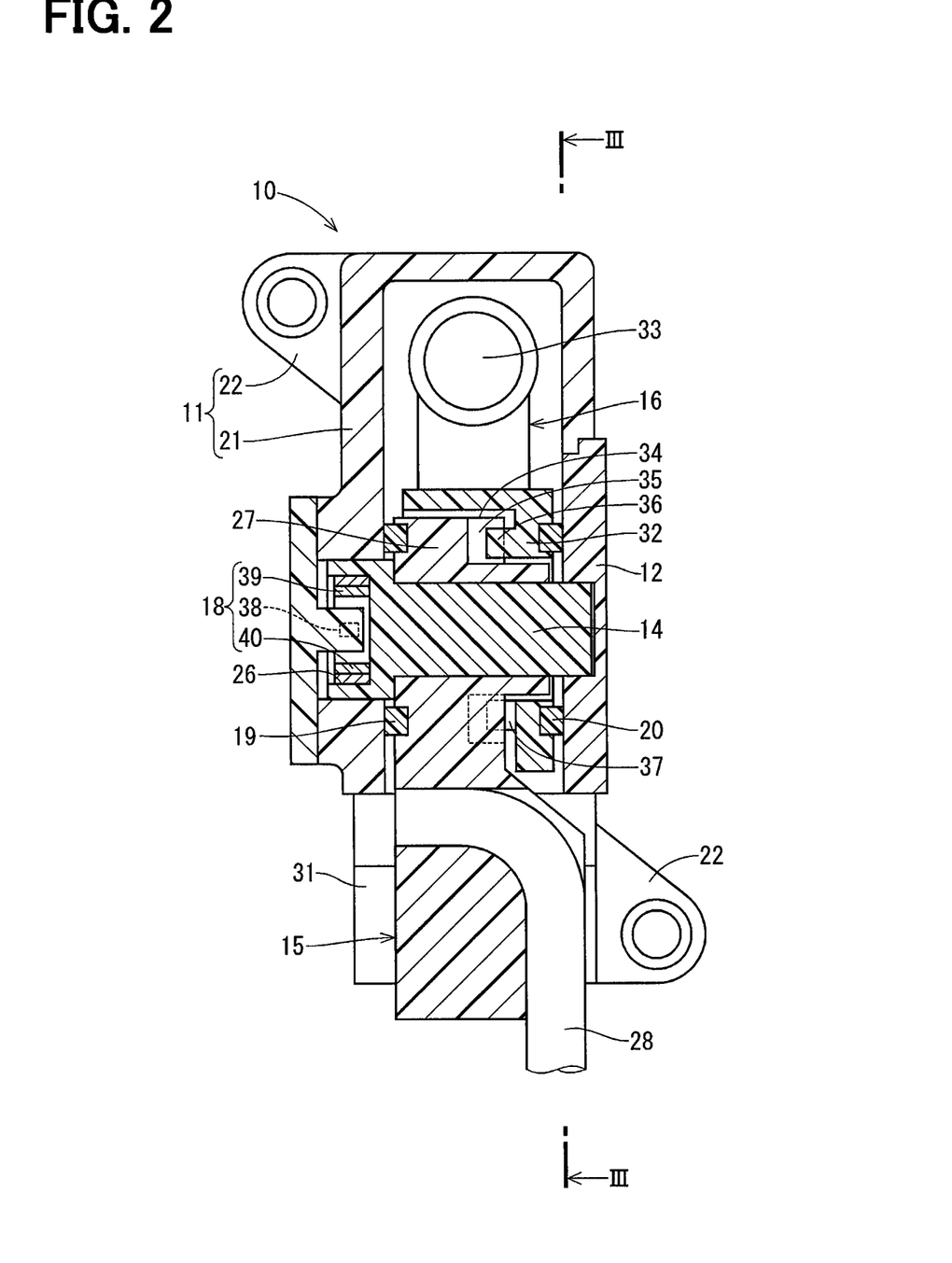
FIG. 2 is a cross-sectional view taken along a line II-II in FIG. 1.
Figure 3:
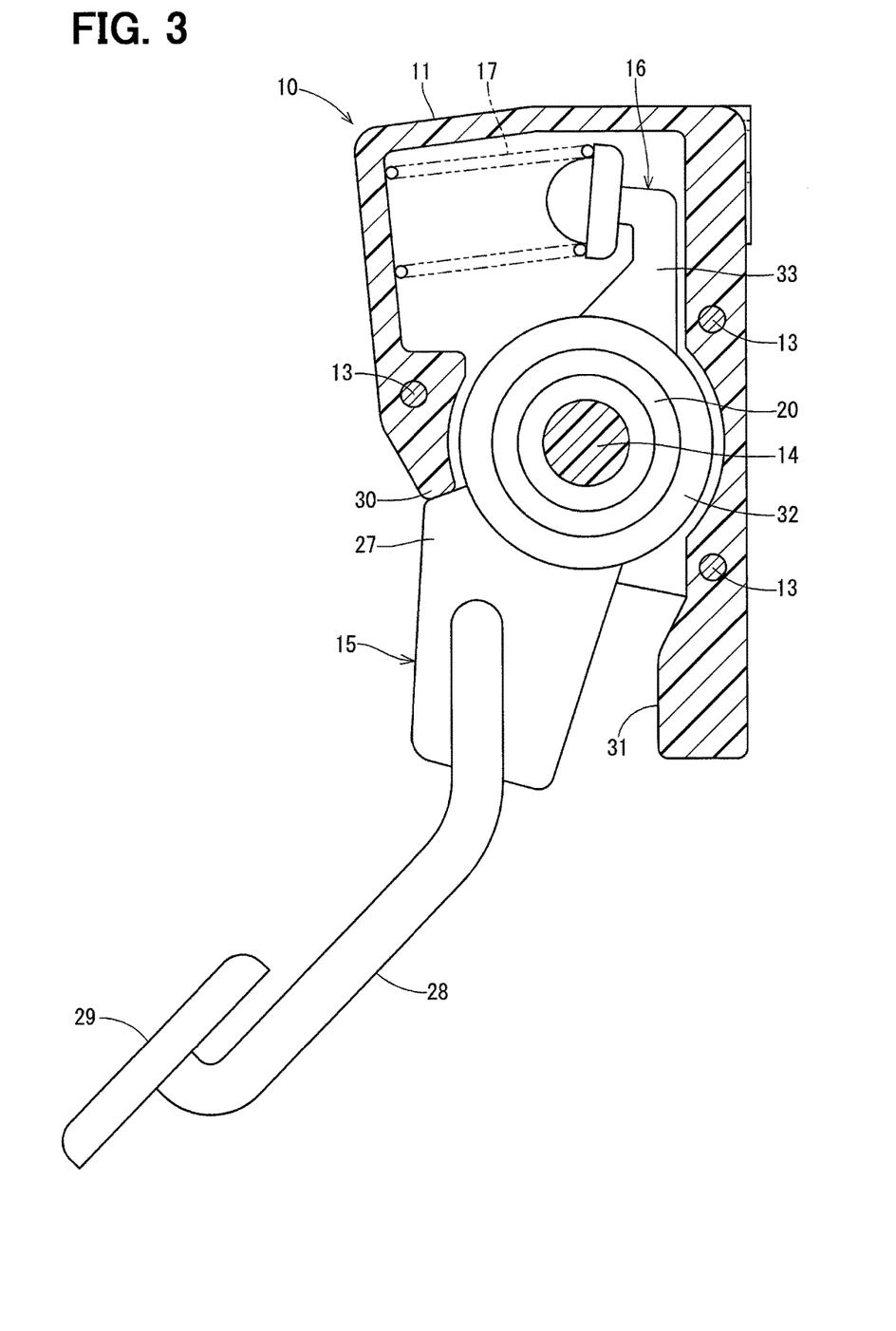
FIG. 3 is a cross-sectional view taken along a line in FIG. 2.

FIGS. 1 to 3 show an accelerator pedal device according to a first embodiment of the present disclosure. An accelerator pedal device 10 is an input device operated by a driver to adjust an operation state of a vehicle engine not shown. The accelerator pedal device 10 is of an electronic type and transmits an electric signal indicative of a depression amount of an accelerator pedal 15 to an electronic control device not shown. The electronic control device drives a throttle valve based on the electric signal transmitted from the accelerator pedal device 10.

First, an overall configuration of the accelerator pedal device 10 will be described with reference to FIGS. 1 to 4. The accelerator pedal device 10 in FIGS. 1 to 3 is shown in a positional relationship attached to a vehicle body 90. As shown in FIGS. 1 to 3, the accelerator pedal device 10 includes a housing 11, a cover 12, screws 13, a shaft 14, the accelerator pedal 15, a link 16, a spring 17, a rotation angle sensor 18, a first friction plate 19, and a second friction plate 20.

The housing 11 includes an accommodation portion 21 and an attachment portion 22 that is attached to the vehicle body 90 by, for example, a bolt 91. In the present embodiment, the housing 11 is made of resin. The housing 11 may be used as an example of a first fastened member.

The cover 12 is combined with the housing 11 so as to cover a part of an opening of the accommodation portion 21. In the present embodiment, the cover 12 is made of resin. The cover 12 may be used as an example of a second fastened member which is combined with the first fastened member.

The screws 13 fasten the housing 11 and the cover 12. In the present embodiment, the screws 13 are metal tapping screws and three screws are provided.

The housing 11, the cover 12 and the screws 13 form a fastening structure.

One end of the shaft 14 is rotatably supported by the housing 11, and the other end of the shaft 14 is rotatably supported by the cover 12. A sensor installation hole 26 is formed at one end of the shaft 14.

The accelerator pedal 15 includes a pedal boss portion 27 that is connected to the shaft 14, a rod 28 that is connected to the pedal boss portion 27, and a pad 29 that is fixed to a distal end portion of the rod 28. The accelerator pedal 15 is rotatable together with the shaft 14 from a fully closed position where the pedal boss portion 27 abuts against a fully closed stopper 30 of the housing 11 to a fully opened position where the pedal boss portion 27 abuts against a fully open stopper 31 of the housing 11.

The link 16 includes an annular link boss portion 32 provided so as to face the pedal boss portion 27 in an axial direction, and a spring locking portion 33 that protrudes from the link boss portion 32. The link boss portion 32 is provided coaxially with the shaft 14. Hereinafter, a direction in which the accelerator pedal 15 rotates from the fully closed position toward the fully opened position is referred to as "accelerator opening direction". Also, a direction in which the accelerator pedal 15 rotates from the fully opened position toward the fully closed position is referred to as "accelerator closing direction".

The pedal boss portion 27 forms multiple first helical teeth 34 protruding toward the link boss portion 32 side. The respective first helical teeth 34 are spaced apart from each other in a circumferential direction. The first helical teeth 34 each have a first inclined surface 35 which is inclined to be positioned in the accelerator closing direction toward the tip.

The link boss portion 32 forms multiple second helical teeth 36 protruding toward the pedal boss portion 27 side. The second helical teeth 36 are disposed one by one between the first helical teeth 34. The second helical teeth 36 each have a second inclined surface 37 which is inclined to be positioned in the accelerator opening direction toward the tip.

The first helical teeth 34 and the second helical teeth 36 transmit the rotation between the accelerator pedal 15 and the link 16 as the inclined surfaces abut against each other. Specifically, the first helical teeth 34 and the second helical teeth 36 transmit the rotation of the accelerator pedal 15 in the accelerator opening direction to the link 16. In addition, the first helical teeth 34 and the second helical teeth 36 transmit the rotation of the link 16 in the accelerator closing direction to the accelerator pedal 15.

Further, when the accelerator pedal 15 rotates in the accelerator opening direction, the first helical teeth 34 and the second helical teeth 36 press the pedal boss portion 27 in a direction away from the link boss portion 32 by abutting the respective inclined surfaces against each other while pressing the link boss portion 32 in a direction away from the pedal boss portion 27. The pressing force at this time increases with increase of the rotation angle (pedal rotation angle) of the accelerator pedal 15 from the fully closed position. The first helical teeth 34 and the second helical teeth 36 may be used as an example of a pressing device that presses the pedal boss portion 27 in a direction away from the link boss portion 32 and toward one of the housing 11 and the cover 12 while pressing the link boss portion 32 in a direction away from the pedal boss portion 27 and toward the other of the housing 11 and the cover 12.

The spring 17 is provided between the spring locking portion 33 and the housing 11 and urges the link 16 toward the accelerator closing direction.

The rotation angle sensor 18 includes a magnetic detection element 38 provided in the sensor installation hole 26 and a pair of magnets 39 and 40 fixed to an inner wall of the sensor installation hole 26. The magnetic detection element 38 outputs an electric signal corresponding to a density of a magnetic flux that changes as the shaft 14 rotates. The rotation angle sensor 18 detects the pedal rotation angle.

The first friction plate 19 is provided between the pedal boss portion 27 and the housing 11, and is fixed to the pedal boss portion 27. The first friction plate 19 is pressed against the housing 11 when the pedal boss portion 27 is pressed so as to be separated from the link boss portion 32. At this time, the frictional force between the first friction plate 19 and the housing 11 becomes a rotational resistance of the accelerator pedal 15 and the link 16.

The second friction plate 20 is provided between the link boss portion 32 and the housing 11, and is fixed to the link boss portion 32. The second friction plate 20 is pressed against the housing 11 when the link boss portion 32 is pressed so as to be separated from the pedal boss portion 27. At this time, the frictional force between the second friction plate 20 and the housing 11 becomes a rotational resistance of the accelerator pedal 15 and the link 16.

In the accelerator pedal device 10 configured as described above, the rotation of the accelerator pedal 15 in the accelerator opening direction is transmitted to the link 16 by engagement of the first inclined surface 35 and the second inclined surface 37 with each other. At this time, the first helical teeth 34 and the second helical teeth 36 press the friction plates 19 and 20 toward the housing 11 and the cover 12 so that the friction force increases more as the pedal rotation angle increases more to apply a rotational resistance to the accelerator pedal 15 and the link 16.

Figure 4:
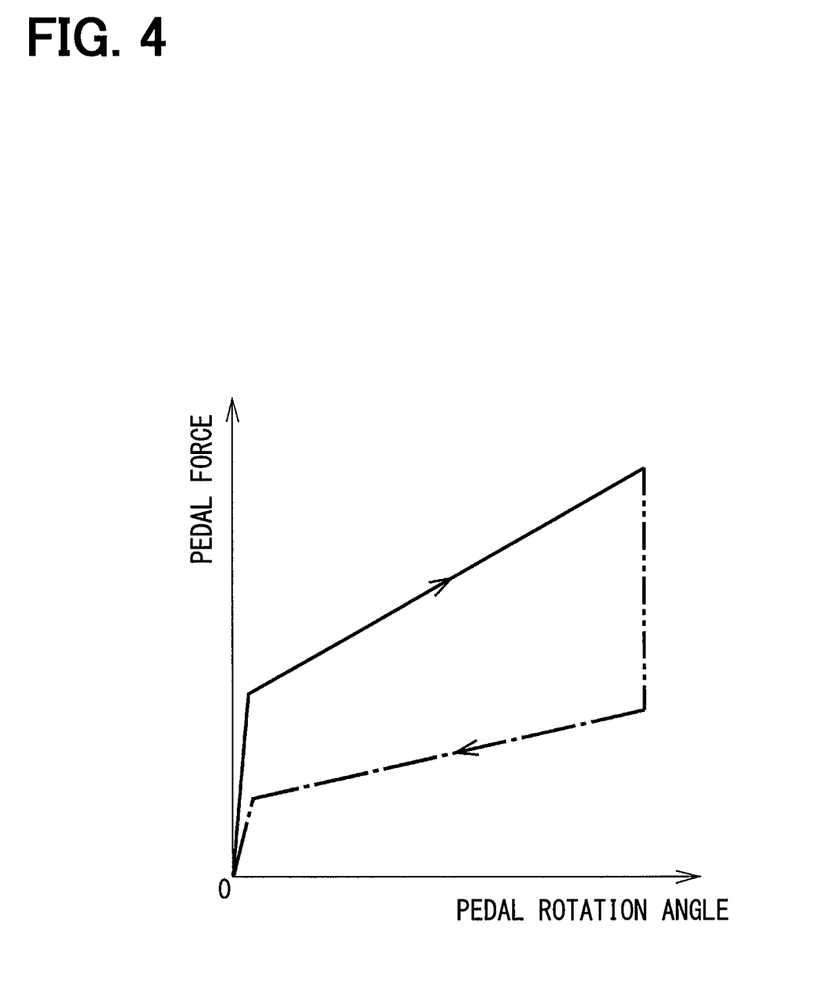
FIG. 4 is a characteristic diagram illustrating a relationship between a pedal force of an accelerator pedal and a pedal rotation angle of the accelerator pedal device in FIG. 1.

When the accelerator pedal 15 is depressed, the rotational resistance acts so as to increase a pedal force as indicated by a solid line in FIG. 4, and when the accelerator pedal 15 is returned, the pedal force decreases as indicated by a one-dot chain line in FIG. 4. In other words, a relationship between the pedal force and a pedal rotation angle draws a hysteresis loop so that the pedal force differs between when the pedal rotation angle increases and when the pedal rotation angle decreases.

Figure 5:
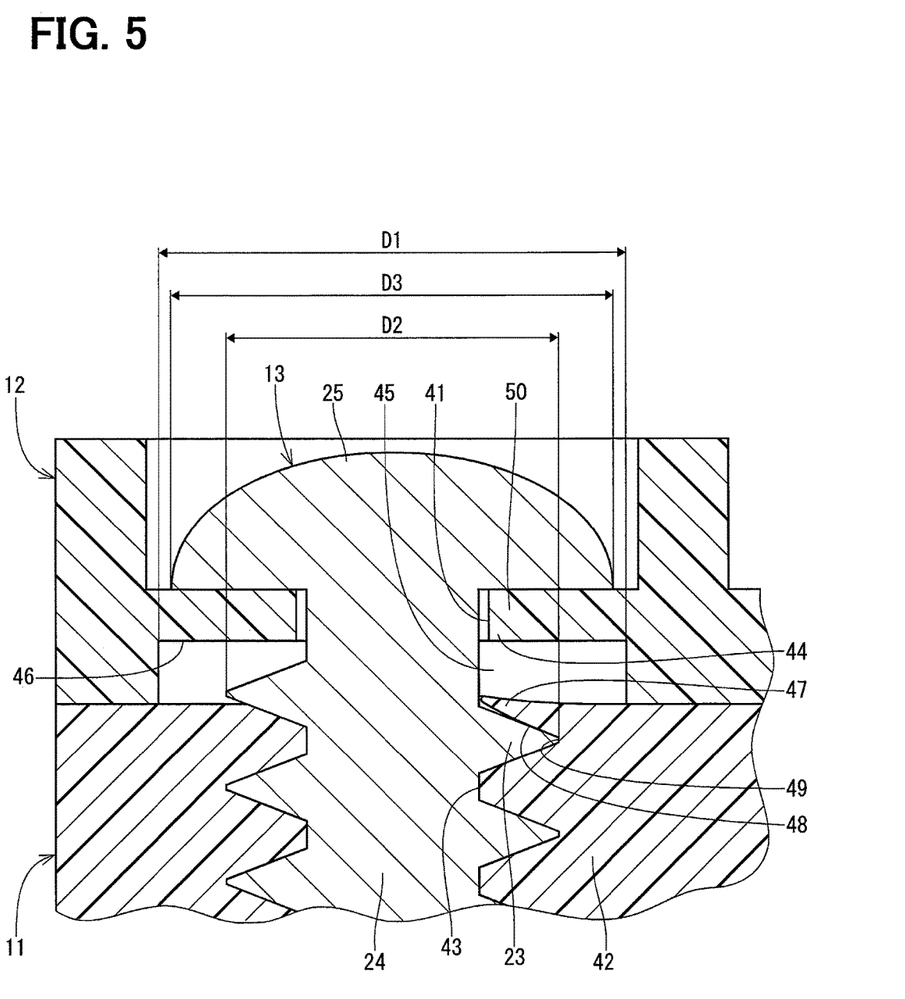
FIG. 5 is a cross-sectional view taken along a line V-V in FIG. 1.

Next, a feature configuration of the accelerator pedal device 10 will be described with reference to FIG. 5. The screw 13 includes a shaft portion 24 forming a spiral thread 23 and a head 25 provided at one end of the shaft portion 24. The screw 13 is inserted into a screw insertion hole 41 of the cover 12 from a side of the cover 12 opposite to the housing 11, and screwed into a screwing hole 43 of a fastening portion 42 of the housing 11. An annular space 45 is provided between an edge 44 of the screw insertion hole 41 on the fastening portion 42 side and the fastening portion 42. An inner diameter D1 of the annular space 45 is larger than an outer diameter D2 of the screw thread 23 and further larger than an outer diameter D3 of the head 25. In the present embodiment, the annular space 45 is an internal space of a recess portion 46 provided in the cover 12. The recess portion 46 may be a portion recessed radially outward from an inner peripheral wall of the screw insertion hole 41 of the cover 12. With the formation of the annular space 45 as described above, an edge 47 of the screwing hole 43 can be bent toward the edge 44 side without coming in contact with the edge 44 of the screw insertion hole 41.

As described above, in the first embodiment, the annular space 45 is provided between the edge 44 of the screw insertion hole 41 of the cover 12 on the fastening portion 42 side and the fastening portion 42 of the housing 11. As described above, by providing the annular space 45, the edge 47 of the screwing hole 43 of the fastening portion 42 can be bent to escape into the annular space 45 even if the edge is pushed up toward the cover 12 side by the screw thread 23 of the screw 13 when the screw 13 is screwed. For that reason, a large tensile stress can be prevented from occurring in a root 49 of a thread groove 48 in the vicinity of the edge 47 of the screwing hole 43. Therefore, in the fastening structure including the cover 12, the housing 11, and the screw 13, breakage such that the edge 47 of the screwing hole 43 is chipped can be prevented.

Figure 6:
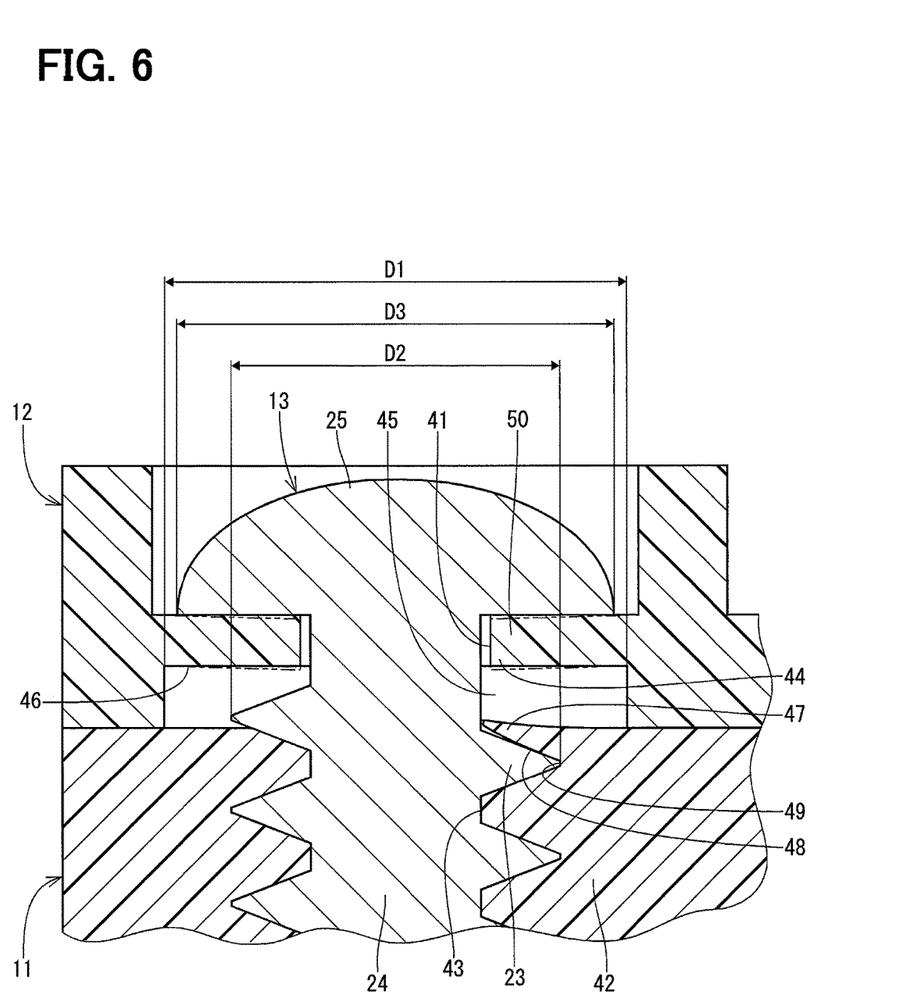
FIG. 6 is a cross-sectional view illustrating a state in which a head receiving portion of a cover of FIG. 5 is bent.

The annular space 45 is provided on a head receiving portion 50 of the cover 12 on the side opposite to the head 25. For that reason, the head receiving portion 50 bends toward the annular space 45 side with time as indicated by a two-dot chain line in FIG. 6, thereby being capable of alleviating the tensile stress acting on the root 49 of the thread groove 48. As illustrated in FIG. 5 and FIG. 6, a thickness of the head receiving portion 50 in an axial direction of the screw 13 is smaller than a length of the screwing hole 43 of the first fastening portion 42 in the axial direction The inner diameter D1 of the annular space 45 is larger than the outer diameter D2 of the screw thread 23. For that reason, the edge 47 of the screwing hole 43 of the fastening portion 42 can sufficiently bend toward the annular space 45 side when the screw 13 is screwed.

The inner diameter D1 of the annular space 45 is larger than the outer diameter D3 of the head 25. For that reason, the head receiving portion 50 of the cover 12 can sufficiently bend toward the annular space 45 with time as indicated by two-dot chain lines in FIG. 6.

In addition, the annular space 45 is an internal space of the recess portion 46 provided in the cover 12. For that reason, the annular space 45 can be provided without shortening the screwing hole 43 of the fastening portion 42 of the housing 11.

Further, the fastening structure including the cover 12, the housing 11 and the screw 13 is used for the accelerator pedal device 10. The housing 11 rotatably supports one end of the shaft 14. The cover 12 rotatably supports the other end of the shaft 14. The accelerator pedal 15 has the pedal boss portion 27 connected to the shaft 14. The link 16 includes the link boss portion 32 provided so as to face the pedal boss portion 27 in the axial direction. The pressing device including the first helical teeth 34 and the second helical teeth 36 presses the pedal boss portion 27 toward the opposite side to the link boss portion 32 and the housing 11 side while pressing the link boss portion 32 toward the opposite side to the pedal boss portion 27 and the cover 12 side, with a larger force as the rotation angle from the fully closed position of the accelerator pedal 15 increases more.

In the accelerator pedal device 10 described above, when the accelerator pedal 15 is depressed, the housing 11 and the cover 12 are pressed in a direction away from each other (a direction of opening the housing 11) by a pressing device, and a stress is exerted on the periphery of the screwing hole 43 of the housing 11. On the other hand, in the present embodiment, as described above, by providing the annular space 45, a large tensile stress is prevented from occurring in the root 49 of the thread groove 48 in the vicinity of the edge 47 of the screwing hole 43 due to the screwing of the screw 13. For that reason, even when the stress is exerted at the time of depression, breakage such as chipping of the edge 47 of the screwing hole 43 can be prevented.

Second Embodiment

Figure 7:
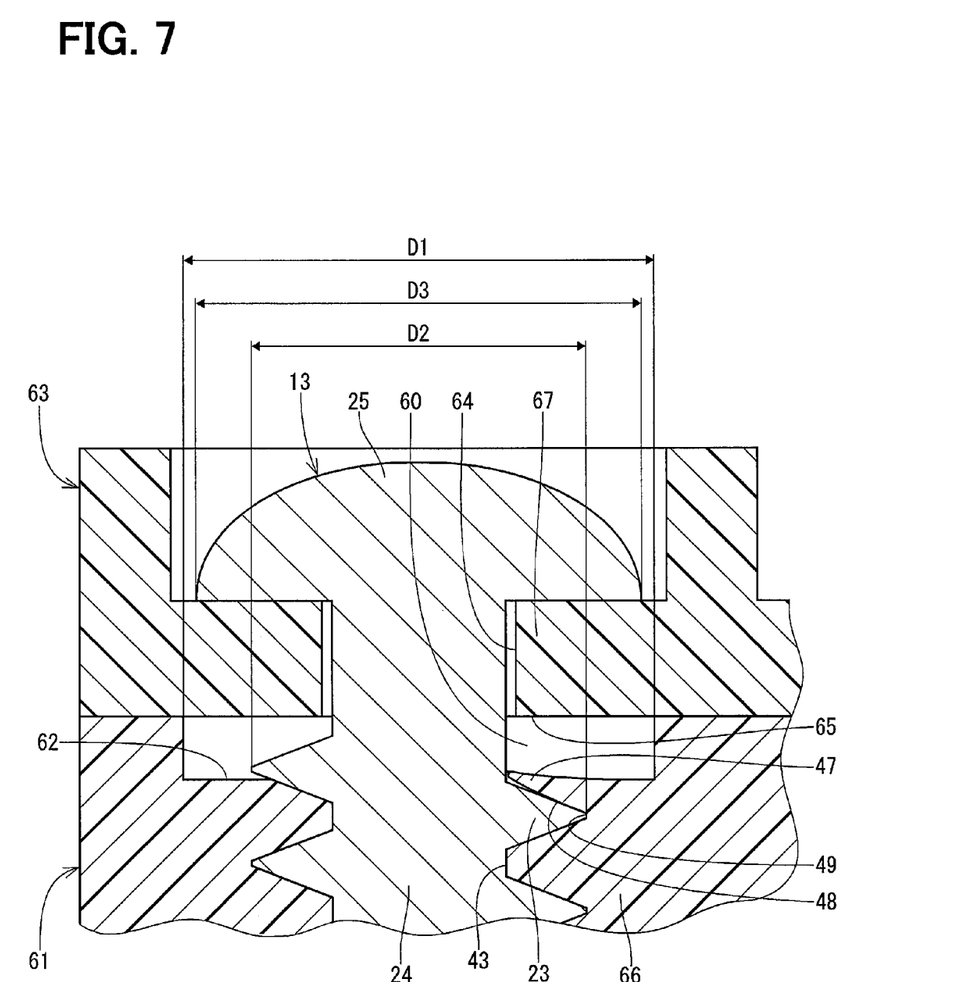
FIG. 7 is a cross-sectional view illustrating a fastening portion of a cover and a housing in an accelerator pedal device according to a second embodiment of the present disclosure.

In a second embodiment of the present disclosure, as shown in FIG. 7, an annular space 60 is an internal space of a recess portion 62 provided in a housing 61. The recess portion 62 may be a portion recessed radially outward from an inner peripheral wall of a screwing hole 43 of the housing 61, or may be partitioned by a head receiving portion 67 of a cover 63 and the housing 61. Even if the annular space 60 is provided in the housing 61 as described above, if the annular space 60 is provided between an edge 65 of a screw insertion hole 64 of the cover 63 and a fastening portion 66 of the housing 61, the same advantages as those of the first embodiment can be obtained. Further, in the second embodiment, the annular space 60 can be provided without lowering a strength of the head receiving portion 67 of the cover 63.

Third Embodiment

Figure 8:
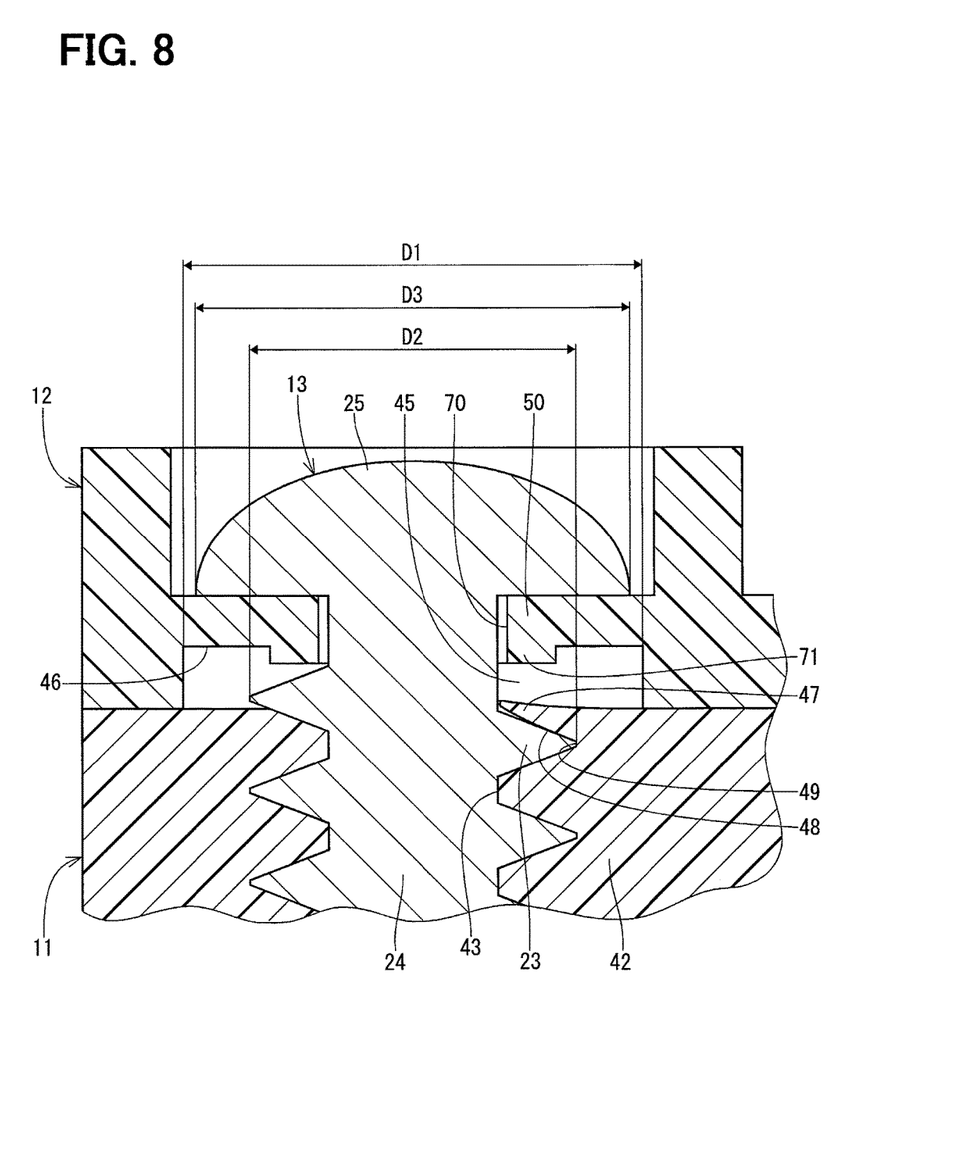
FIG. 8 is a diagram illustrating a fastening portion of a cover and a housing in an accelerator pedal device according to a third embodiment of the present disclosure.

In a third embodiment of the present disclosure, as shown in FIG. 8, an edge 71 of a screw insertion hole 70 forms an annular protrusion that protrudes into an annular space 45. For that reason, a strength of a head receiving portion 50 of a cover 12 can be improved by the edge 71.

Fourth Embodiment

Figure 9:
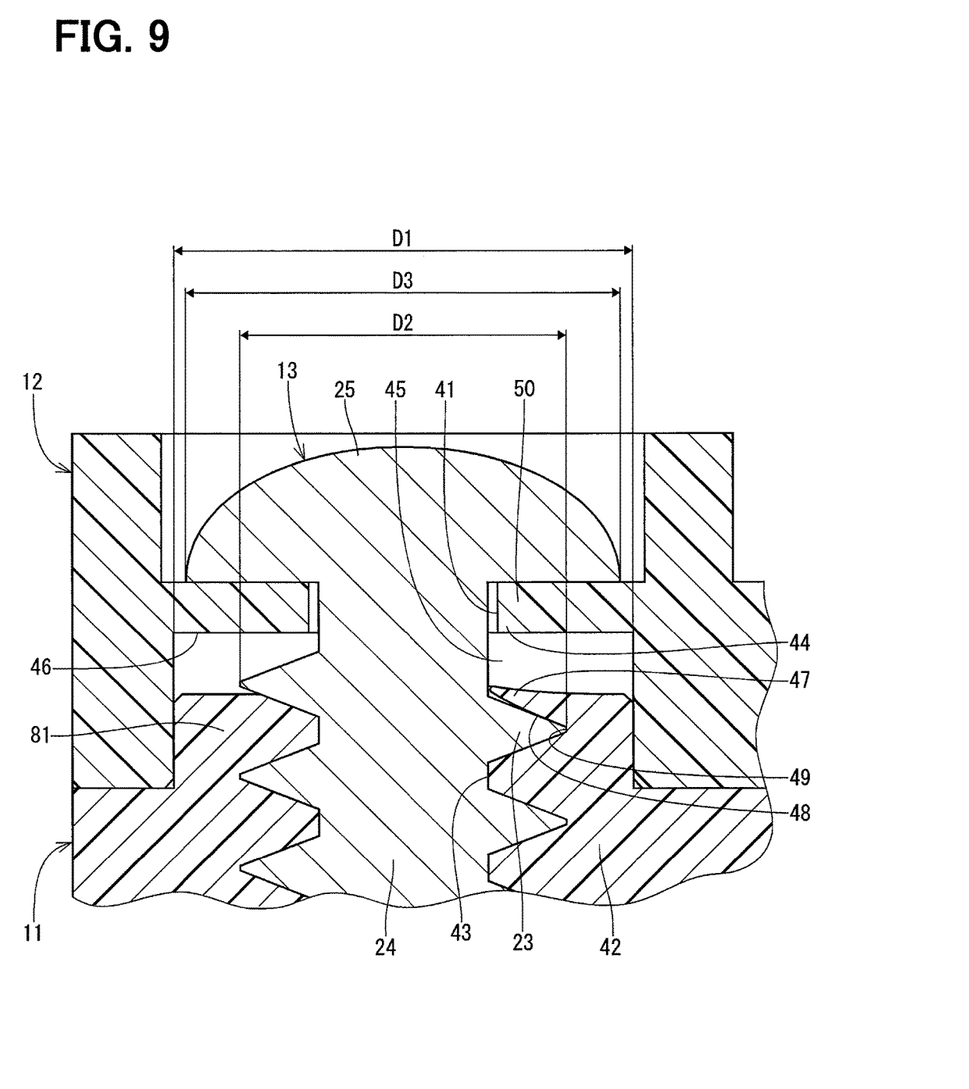
FIG. 9 is a diagram illustrating a fastening portion of a cover and a housing in an accelerator pedal device according to a fourth embodiment of the present disclosure.

In a fourth embodiment of the present disclosure, as shown in FIG. 9, an annular space 45 is an internal space of a recess portion 46 provided in a cover 12. A housing 11 includes a position fixing protrusion 81 fitted in the recess portion 46. By providing the position fixing protrusion 81 as described above, a positioning accuracy between the housing 11 and the cover 12 is improved.

Fifth Embodiment

Figure 10:
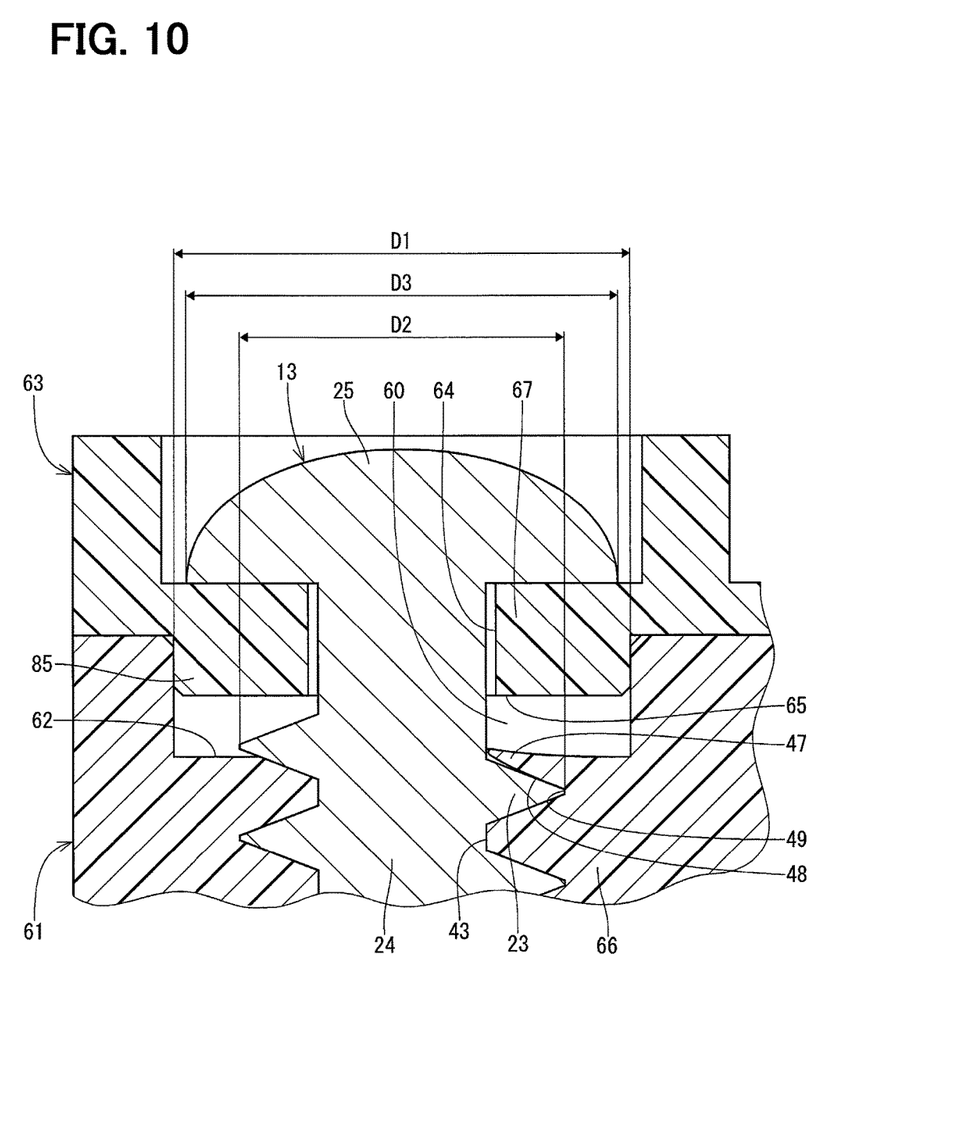
FIG. 10 is a diagram illustrating a fastening portion of a cover and a housing in an accelerator pedal device according to a fifth embodiment of the present disclosure.

In a fifth embodiment of the present disclosure, as shown in FIG. 10, an annular space 60 is an internal space of a recess portion 62 provided in a housing 61. A cover 63 includes a position fixing protrusion 85 fitted in the recess portion 62. By providing the position fixing protrusion 85 as described above, a positioning accuracy between the housing 61 and the cover 63 is improved.

In a modification of the above embodiment according to the present disclosure, the annular space may be smaller than an outer diameter of a screw head. In addition, the annular space may be smaller than the outer diameter of the screw thread of the screw. In short, the annular space may be provided between the edge of the screw insertion hole of the cover and the housing. In a modification of the above embodiment according to the present disclosure, the annular space may be a space provided by combining the internal space of the recess portion provided in the cover and the internal space of the recess portion provided in the housing. In a modification of the above embodiment according to the present disclosure, the screw is not limited to the tapping screw, but may be another type of screw without a tapping function. Further, the screw is not limited to being made of metal, but it may be made of resin, for example.

In a modification of the above embodiment according to the present disclosure, the first fastened member and the second fastened member are not limited to being made of resin, and may be made of, for example, metal. In a modification of the above embodiment according to the present disclosure, the accelerator pedal device may be of another type known in the art. In short, the accelerator pedal device may be of a type having a fastening structure including the housing, the cover and the screw. In a modification of the above embodiment according to the present disclosure, the fastening structure is not limited to the accelerator pedal device, and may be applied to other devices. The present disclosure is not limited to the embodiments described above, and can be implemented in various forms without departing from a spirit of the present disclosure.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

The invention claimed is:

1. A fastening structure comprising:
a first fastened member that includes a portion defining a threaded hole;
a second fastened member that is combined with the first fastened member, the second fastened member includes a screw insertion hole, and the second fastened member includes an annular space between an edge of the screw insertion hole and an edge of the threaded hole; and
a screw that is inserted into the screw insertion hole from a side of the second fastened member facing away from the first fastened member, the screw being screwed into the threaded hole to fasten the first fastened member and the second fastened member,
the second fastened member includes a head receiving portion that receives and supports a head of the screw at a bottom of the head receiving portion,
the second fastened member includes a recess portion with a diameter larger than a diameter of the screw insertion hole,
the screw insertion hole extends between a bottom of the recess portion and the bottom of the head receiving portion,
a thickness of the head receiving portion in an axial direction of the screw is smaller than a length of the threaded hole of the first fastened member in the axial direction of the screw,
an inner diameter of the annular space is larger than an outer diameter of the head of the screw,
the first fastened member includes a position fixing projection with a diameter larger than the diameter of the screw insertion hole,
the position fixing projection is fitted into the recess portion,
the annular space is also between the position fixing projection and the head receiving portion,
the position fixing projection and the portion defining the threaded hole are a first unitary component made of resin, and
the recess portion and the head receiving portion are a second unitary component made of resin.

2. The fastening structure according to claim 1, wherein the inner diameter of the annular space is larger than an outer diameter of a screw thread of the screw.

3. An accelerator pedal device comprising:
a first fastened member that includes a portion defining a threaded hole;
a second fastened member that is combined with the first fastened member, the second fastened member includes a screw insertion hole, and the second fastened member includes an annular space between an edge of the screw insertion hole and an edge of the threaded hole;

a screw that is inserted into the screw insertion hole from a side of the second fastened member facing away from the first fastened member, the screw being screwed into the threaded hole to fasten the first fastened member and the second fastened member;

a shaft that has one end rotatably supported by the first fastened member and another end rotatably supported by the second fastened member;

an accelerator pedal that includes a pedal boss portion connected to the shaft;

a link that includes a link boss portion provided to face the pedal boss portion in an axial direction of the shaft; and a pressing device that presses the pedal boss portion in a direction away from the link boss portion and toward one of the first fastened member and the second fastened member while pressing the link boss portion in a direction away from the pedal boss portion and toward another of the first fastened member and the second fastened member, with a force which increases with increase of a rotational angle of the accelerator pedal from a fully closed position, wherein the second fastened member includes a head receiving portion that receives and supports a head of the screw at a bottom of the head receiving portion, the second fastened member includes a recess portion with a diameter larger than a diameter of the screw insertion hole, the screw insertion hole extends between a bottom of the recess portion and the bottom of the head receiving portion, a thickness of the head receiving portion in an axial direction of the screw is smaller than a length of the threaded hole of the first fastened member in the axial direction of the screw, and an inner diameter of the annular space is larger than an outer diameter of the head of the screw, the first fastened member includes a position fixing projection with a diameter larger than the diameter of the screw insertion hole, the position fixing projection is fitted into the recess portion, the annular space is also between the position fixing projection and the head receiving portion, the position fixing projection and the portion defining the threaded hole are a first unitary component made of resin, and the recess portion and the head receiving portion are a second unitary component made of resin.

4. The accelerator pedal device according to claim 3, wherein the inner diameter of the annular space is larger than an outer diameter of a screw thread of the screw.

* * * * *